United States Patent [19]

Härtel et al.

[11] Patent Number: 4,942,075
[45] Date of Patent: Jul. 17, 1990

[54] ANNULAR RESILIENT BODY MADE OF FIBER COMPOSITE MATERIALS

[75] Inventors: Volker Härtel, Germering; Carl Heynemann, Taufkirchen; Werner Hundt, Munich; Siegfried Müller, Allershausen; Matthias Richter, Inning, all of Fed. Rep. of Germany

[73] Assignee: Metzeler GmbH, München, Fed. Rep. of Germany

[21] Appl. No.: 384,822

[22] Filed: Jul. 24, 1989

[30] Foreign Application Priority Data

Jul. 22, 1988 [DE] Fed. Rep. of Germany ....... 3825022
Mar. 15, 1989 [DE] Fed. Rep. of Germany ....... 3908474

[51] Int. Cl.$^5$ .......................... B32B 5/26; F16F 1/36
[52] U.S. Cl. .................................... 428/109; 428/113; 267/141; 267/148; 267/153; 248/632; 248/634
[58] Field of Search ............... 428/105, 107, 109, 112, 428/110, 113; 267/141, 148, 149, 152, 153; 248/632, 634, 638

[56] References Cited

U.S. PATENT DOCUMENTS 4,422,627 12/1983 Schmidt et al. ................ 267/141 X Primary Examiner—Alexander S. Thomas
Attorney, Agent, or Firm—Herbert L. Lerner; Laurence A. Greenberg

[57] ABSTRACT

An annular resilient body of fiber composite material for vibration-insulating support of drive assemblies includes at least one wound body having a circumferential direction and a loading direction. The at least one wound body includes a plurality of wound concentric layers formed of synthetic resin impregnated fibers extending in the circumferential direction and transverse to the load direction, and at least one layer of fibers extending at an angle relative to the concentric layers. Force-inducing fastening elements are disposed on two opposite sides of the at least one wound body. The fastening elements are formed of metal brackets at least partly encompassing the at least one wound body and elastic rubber layers bracing the metal brackets against the at least one wound body.

29 Claims, 2 Drawing Sheets

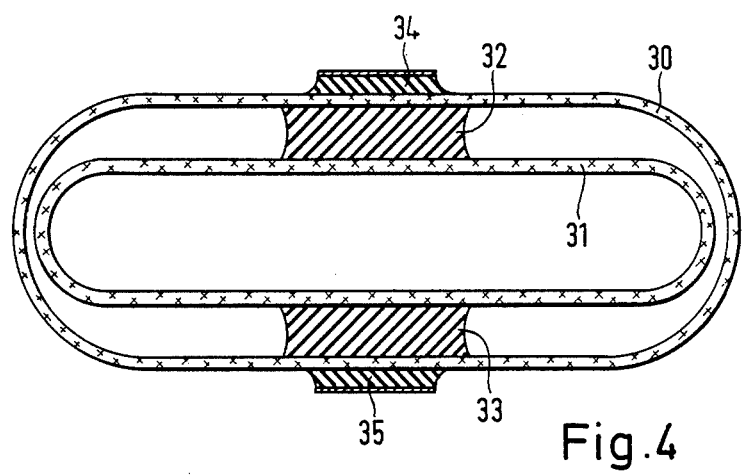
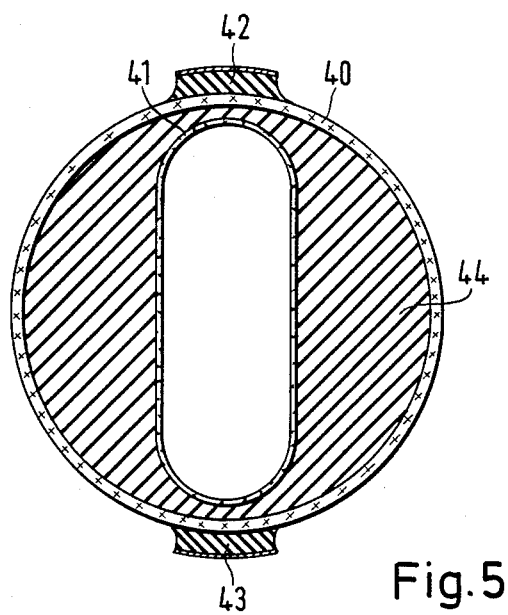

ANNULAR RESILIENT BODY MADE OF FIBER COMPOSITE MATERIALS

The invention relates to an annular resilient body of fiber composite materials for vibration-insulated support of drive assemblies, particularly in motor vehicles, which has a wound body in which synthetic resin impregnated fibers are wound correspondingly in a plurality of layers and which is fastened at two opposite sides.

Typically, the engine and transmission in motor vehicles are supported by rubber and metal elements, in order to damp vibration and in particular to reduce noise transmission. However, bearing elements or mounts of that kind have a number of system-dictated disadvantages. For instance, the static spring deflection increases with the load time because of settling of the rubber which makes for worse acoustical insulation, if the compression stops come into play too soon. Since rubber hardens dynamically as well, increasing frequency brings an increasingly dynamic rigidity of the mount, which promotes the transmission of high-frequency vibration. If a very soft basic mount setting is selected to counteract this, the result once again is pronounced settling of the mount. Finally, the natural rubbers generally used for engine mounts are suitable for ambient temperatures of only up to approximately 120° C.

On the other hand, German Patent No. DE-PS 30 22 418 has already disclosed a resilient body of fiber composite materials that has a frame-like shape. However, that resilient body is assembled from wound bodies which are layered in the plane of the frame, and corresponding intermediate layers, making that resilient body very rigid. Moreover, the resilient body can only be made in sizes that are unsuitable for use in motor vehicles.

It is accordingly an object of the invention to provide an annular resilient body made of fiber composite materials, which overcomes the hereinafore-mentioned disadvantages of the heretofore-known devices of this general type, which does not settle under static load and the dynamic rigidity of which does not rise substantially beyond the static rigidity with increasing frequency, so that it thus assures good acoustic insulation.

With the foregoing and other objects in view there is provided, in accordance with the invention, an annular resilient body of fiber composite material for vibration-insulating support of drive assemblies, especially in motor vehicles, comprising at least one wound body having a circumferential direction and a loading direction, the at least one wound body including a plurality of wound concentric layers formed of synthetic resin impregnated fibers extending in the circumferential direction and transverse to the load direction, and at least one layer of fibers extending at an angle relative to the concentric layers; and force-inducing fastening elements disposed on two opposite sides of the at least one wound body, the fastening elements being formed of metal brackets at least partly encompassing the at least one wound body and elastic rubber layers bracing the metal brackets against the at least one wound body.

A resilient body of this kind can be made sufficiently small and with a relatively thin wall thickness, and it has optimal spring characteristics without static settling and without dynamic hardening.

In accordance with another feature of the invention, there is provided at least one other wound body, the wound bodies having a common center of gravity and being nested in one another, and at least one intermediate layer formed of a different material than the wound bodies being disposed between and mutually spacing apart the wound bodies at least at intervals.

In accordance with a further feature of the invention, the wound bodies have mutually parallel outer contours defining an equal spacing therebetween all around.

In accordance with an added feature of the invention, the at least one intermediate layer is formed of rubber being vulcanized onto the wound bodies.

For simpler manufacture, in accordance with an additional feature of the invention, the at least one intermediate layer is formed of rubber bands being wound in place and extending at an angle relative to the circumferential direction.

In accordance with yet another feature of the invention, the at least one the intermediate layer is formed of slide foils wound in place in layers.

In accordance with yet a further feature of the invention, the slide foils are formed of PTFE (polytetrafluoroethylene).

In accordance with yet an added feature of the invention, the at least one intermediate layer has at least one lateral surface guided loosely against one of the wound bodies adjacent thereto. This is done in order to avoid fissures in the longitudinal direction.

In accordance with yet an additional feature of the invention, the wound bodies are braced against one another prior to vulcanizing the rubber intermediate layers in place. This is done in order to attain non-linear spring characteristics.

In accordance with still another feature of the invention, the elastic rubber layers are vulcanized, glued or clamped in place between the metal brackets and the at least one wound body.

In accordance with still a further feature of the invention, the metal brackets are closed rings having rectangular cross sections encompassing the at least one wound body and having lateral connection elements.

In accordance with still an added feature of the invention, the metal brackets are formed of two U-shaped straps braced against one another.

In accordance with still an additional feature of the invention, there is provided a rubber cushion vulcanized as a compression stop onto at least one of the metal brackets at an inner surface of the at least one wound body.

In accordance with again another feature of the invention, the at least one wound body has tension stops in the vicinity of the fastening elements.

In accordance with again a further feature of the invention, the tension stops are formed of elements being flexible or loosely movable in the compression direction and having a stop limiting an outward spring deflection path under a tensile load. Tension stops loosely moving in the pressure direction in this manner are known from German Petty Patent No. DE-GM 19 06 805 for rubber-metal components, that is vibration mounts.

In accordance with a concomitant feature of the invention, the at least one wound body is prestressed by tightening the tension stops.

Other features which are considered as characteristic for the invention are set forth in the appended claims.

Although the invention is illustrated and described herein as embodied in an annular resilient body made of fiber composite materials, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 4 is a cross-sectional view of a resilient body having two coaxially disposed wound bodies; and FIG. 5 is a cross-sectional view of a resilient body having two wound bodies of dissimilar geometry.

Figure 1:
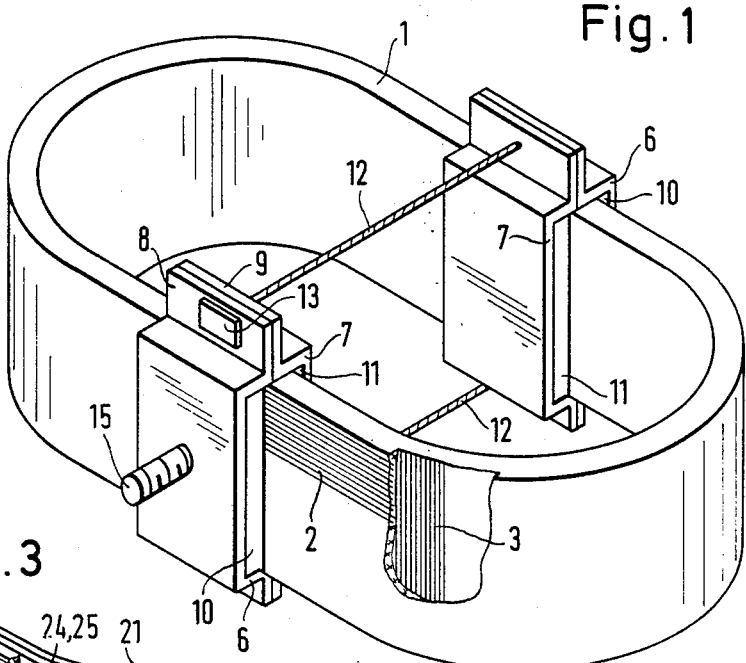
FIG. 1 is a diagrammatic, partly broken-away perspective view of a resilient body being formed a wound body having two fastenings.

Referring now to the figures of the drawing in detail and first, particularly, to FIG. 1 thereof, there is seen a resilient body being formed a single wound body 1 with an approximately oval shape having two straight middle segments and semicircular end segments. However, any other closed geometrical shape is also possible, such as an ellipse or a circle, depending on requirements.

The wound body 1 is formed of a plurality of layers of fibers, wound all the way around, primarily transversely to the direction of strain. An outermost layer 2 is broken away. However, some of the layers, preferably a middle layer 3 of the wound body 1, are suitably formed of fabric with fibers that run transversely, or fibers wound at an angle differing from that of the outer layer 2.

Reinforcing fibers that can be used essentially include glass fibers, as well as carbon fibers or aramide, while curable matrix materials that can be used essentially include pressure setting plastics, or thermoplastics such as polyether ether ketone (PEEK).

The completely wound body 1, saturated and cured, is then fastened at opposed sides to the appropriate support points through suitable force inducing elements In the illustrated exemplary embodiment, these force inducing elements may be formed of brackets in the form of two U-shaped straps 6 and 7, which are braced against one another through lateral ribs 8 and 9 and encompass the long sides of the wound body 1. Elastic intermediate layers 10 and 11 which are formed of rubber are provided between the straps 6 and 7 and the wound body 1. These rubber layers 10 and 11 may be vulcanized in place between the respective straps 6 and 7 and the winding body 1. Alternatively, they may be glued in or merely clamped in place.

As also shown in FIG. 1, though only diagrammatically, a tension stop may be provided and may, for instance, be formed of a flexible wire cable 12 that is affixed to the ribs or webs 8 and 9 of the two force inducing elements in a support 13. A tension stop of this kind is flexible in the compression direction, but prevents excessive expansion of the resilient ring in the tension direction. Besides the exemplary embodiment shown, other embodiments of the tension stop are also possible. However, the tension stop should always be constructed in such a way that it is flexible or loosely movable in the compression direction and provides a travel limitation in the tension direction.

Figure 2:
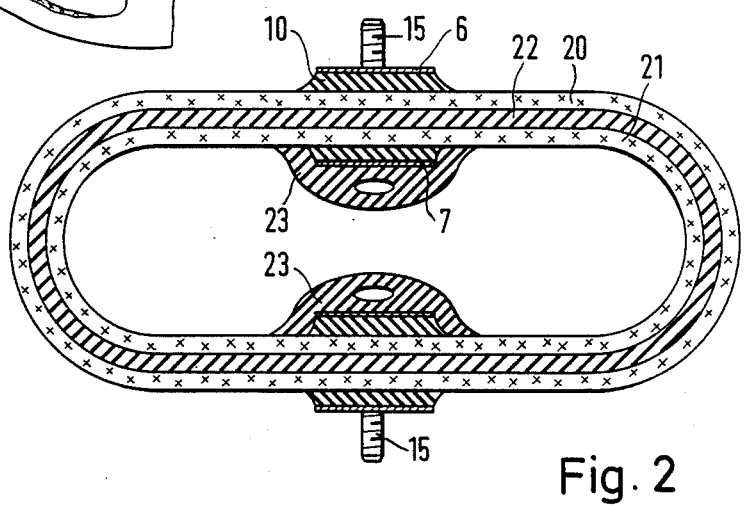
FIG. 2 is a cross-sectional view of a resilient body formed of two concentrically disposed wound bodies.

In the exemplary embodiment of FIG. 2, two concentric wound bodies 20 and 21 which extend parallel to one another are joined to one another through an elastic intermediate layer 22 of rubber, which extends over the entire circumference of the intervening space. The two wound bodies 20 and 21 are produced in the same manner and have the same structure as the wound body 1 of FIG. 1 and after they are made, the corresponding rubber layer 22 is vulcanized in place between the two wound bodies 20 and 21.

In the process of vulcanizing the rubber in place, the wound bodies 20 and 21 may be used without force, that is, without prestressing. However, in order to develop certain intrinsic stresses it is possible to brace the two wound bodies 20 and 21 against one another prior to the vulcanization, which makes it possible to attain a non-linear or S-shaped static spring characteristic curve.

The attachment to the engine or bearing point in the vehicle is effected in the same way as with the resilient body of FIG. 1, through the rubber layers 10 and the brackets 6 and 7 as well as screw bolts 15 on the outside. However, other fastening elements are also possible.

Additionally, the resilient body shown is also provided with compression stops on the inside which, for instance, may be formed of rubber cushions 23 vulcanized onto the inner bracket 7. However, it is also possible to provide a rubber cushion on only one side or to provide a one-piece, continuous rubber cushion.

In the resilient body shown in FIG. 2, two wound bodies are provided with a rubber layer vulcanized therebetween. However, it is also possible to use more than two wound bodies with a corresponding number of rubber layers, depending on the particular requirements and loads involved.

Figure 3:
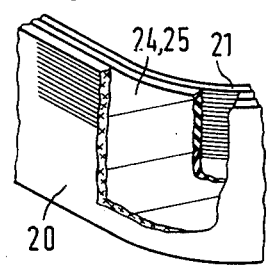
FIG. 3 is a fragmentary cross-sectional and perspective view of a resilient body with an intermediate layer wound in place.

However, instead of vulcanizing the rubber layer 22 in place as shown in FIG. 2, it is also possible to construct the intermediate layer with rubber bands 24, which are wound in place in layers, as shown in the fragmentary cross section of FIG. 3. This simplifies manufacture considerably, because the rubber bands 24 are then wound directly onto the inner wound body 21 at an angle relative to the circumferential direction in a continuous winding process. The outer wound body 20 is then subsequently applied.

However, instead of such rubber bands 24, it is also possible to use slide foils 25, which are especially formed of PTFE and are likewise wound in place in layers during the manufacture of the resilient body. This separately wound intermediate layer is advantageously intended to be firmly guided on one end with respect to the adjacent wound body, and loosely guided on the other. Preferably, there is a connection between the inner wound body 21 and the intermediate layer 25, but the intermediate layer 25 is not connected to the outer wound body 20. On one hand, this prevents cracks in the longitudinal direction and therefore straightening of the resilient body, especially in the case of shear loads. On the other hand, the separate guidance provides high resiliency in contrast to a compact spring, so that despite equal durability, the dynamic rigidity is substantially reduced. Finally, such slide layers lead to an additional amplitude-dependent friction damping in the resilient body, which may be advantageous, particularly in the low-frequency range.

FIG. 4 shows a further resilient body having two wound bodies 30 and 31 which, however, only extend parallel to one another along the straight segments. In the exemplary embodiment of FIG. 4, the gap between the two wound bodies 30 and 31 is not completely filled with rubber Instead, only two segments are so filled with layers 32 and 33, which is fully adequate for the coupling, given suitable desired characteristic curves. Once again, the outer wound body 30 is provided with force inducing elements 34 and 35 correspondingly vulcanized onto it.

In the exemplary embodiment shown in FIG. 5, a resilient body having two wound bodies 40 and 41 of dissimilar geometric shape is shown. The cross section of the outer wound body 40 is circular, while the inner wound body 41 has an oval shape, the longest length of which is slightly less than or equal to the inside diameter of the circular wound body 40. Preferably, the inner wound body 41 is very much thinner than the outer, so that with force induction through two correspondingly curved force inducing elements 42 and 43, it is possible for the inner wound body 41 to bulge outward.

With this resilient body, the entire space between the wound bodies 40 and 41 is filled with a rubber layer 44.

The overall result is accordingly a resilient body that does not exhibit any settling under static load. A resilient body in a single-shell structure corresponding to FIG. 1 has a linear dynamic characteristic curve that is virtually independent of frequency at the level of the static rigidity. As a result, especially dynamic hardening with increasing frequency and worsening of the acoustical transmission, are avoided.

With a multi-layered structure having intervening rubber layers, it is possible to advantageously vary the damping and resiliency of the resilient body, depending on the configuration and length of the rubber coupling.

Furthermore, if suitable resins are used, the temperatures at which such resilient bodies can be used may be as high as 150° C. Additionally, there is a reduction in weight of up to 50% compared with comparable rubber-metal vibration mounts.

We claim:

1. Annular resilient body of fiber composite material for vibration-insulating support of drive assemblies, comprising at least one wound body having a circumferential direction and a loading direction, said at least one wound body including a plurality of wound concentric layers formed of synthetic resin impregnated fibers extending in the circumferential direction and transverse to the load direction, and at least one layer of fibers extending at an angle relative to said concentric layers; and force-inducing fastening elements disposed on two opposite sides of said at least one wound body, said fastening elements being formed of metal brackets at least partly encompassing said at least one wound body and elastic rubber layers bracing said metal brackets against said at least one wound body.

2. Resilient body according to claim 1, including at least one other wound body, said wound bodies having a common center of gravity and being nested in one another, and at least one intermediate layer formed of a different material than said wound bodies being disposed between and mutually spacing apart said wound bodies at least at intervals.

3. Resilient body according to claim 2, wherein said wound bodies have mutually parallel outer contours defining an equal spacing therebetween all around.

4. Resilient body according to claim 3, wherein said at least one intermediate layer is formed of rubber being vulcanized onto said wound bodies.

5. Resilient body according to claim 3, wherein said at least one intermediate layer is formed of rubber bands being wound in place and extending at an angle relative to the circumferential direction.

6. Resilient body according to claim 5, wherein said at least one intermediate layer has at least one lateral surface guided loosely against one of said wound bodies adjacent thereto.

7. Resilient body according to claim 3, wherein said at least one the intermediate layer is formed of slide foils wound in place in layers.

8. Resilient body according to claim 7, wherein said slide foils are formed of polytetrafluoroethylene.

9. Resilient body according to claim 6, wherein said at least one intermediate layer has at least one lateral surface guided loosely against one of said wound bodies adjacent thereto.

10. Resilient body according to claim 2, wherein said wound bodies are braced against one another prior to vulcanizing said rubber intermediate layers in place.

11. Resilient body according to claim 1, wherein said elastic rubber layers are vulcanized in place between said metal brackets and said at least one wound body.

12. Resilient body according to claim 11, wherein said metal brackets are closed rings having rectangular cross sections encompassing said at least one wound body and having lateral connection elements.

13. Resilient body according to claim 12, including a rubber cushion vulcanized as a compression stop onto at least, one of said metal brackets at an inner surface of said at least one wound body.

14. Resilient body according to claim 11, wherein said metal brackets are formed of two U-shaped straps braced against one another.

15. Resilient body according to claim 14, including a rubber cushion vulcanized as a compression stop onto at least one of said metal brackets at an inner surface of said at least one wound body.

16. Resilient body according to claim 1, wherein said rubber layers are glued in place between said metal brackets and said at least one wound body.

17. Resilient body according to claim 16, wherein said metal brackets are closed rings having rectangular cross sections encompassing said at least one wound body and having lateral connection elements.

18. Resilient body according to claim 17, including a rubber cushion vulcanized as a compression stop onto at least one of said metal brackets at an inner surface of said at least one wound body.

19. Resilient body according to claim 16, wherein said metal brackets are formed of two U-shaped straps braced against one another.

20. Resilient body according to claim 19, including a rubber cushion vulcanized as a compression stop onto at least one of said metal brackets at an inner surface of said at least one wound body.

21. Resilient body according to claim 1, wherein said rubber layers are clamped in place between said metal brackets and said at least one wound body.

22. Resilient body according to claim 21, wherein said metal brackets are closed rings having rectangular cross sections encompassing said at least one wound body and having lateral connection elements.

23. Resilient body according to claim 22, including a rubber cushion vulcanized as a compression stop onto at least one of said metal brackets at an inner surface of said at least one wound body.

24. Resilient body according to claim 21, wherein said metal brackets are formed of two U-shaped straps braced against one another.

25. Resilient body according to claim 24, including a rubber cushion vulcanized as a compression stop onto at least one of said metal brackets at an inner surface of said at least one wound body.

26. Resilient body according to claim 1, wherein said at least one wound body has tension stops in the vicinity of said fastening elements.

27. Resilient body according to claim 26, wherein said tension stops are formed of elements being flexible in the compression direction and having a stop limiting an outward spring deflection path under a tensile load.

28. Resilient body according to claim 26, wherein said tension stops are formed of elements being loosely movable in the compression direction and having a stop limiting an outward spring deflection path under a tensile load.

29. Resilient body according to claim 26, wherein said at least one wound body is prestressed by tightening said tension stops.

* * * * *